Jan. 5, 1971  A. S. RYAN  3,553,048

METHOD OF MAKING A SURFACE OVERLAY PRODUCT

Filed May 29, 1967  2 Sheets-Sheet 1

INVENTOR
ARTHUR S. RYAN
BY
ATTORNEYS

Jan. 5, 1971 A. S. RYAN 3,553,048
METHOD OF MAKING A SURFACE OVERLAY PRODUCT
Filed May 29, 1967 2 Sheets-Sheet 2
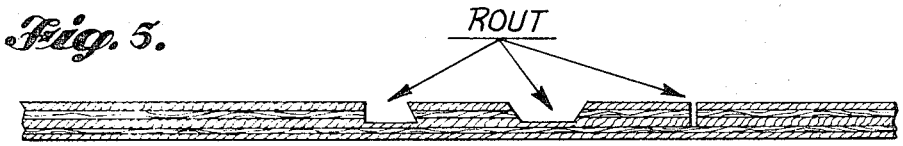
Fig. 5. ROUT
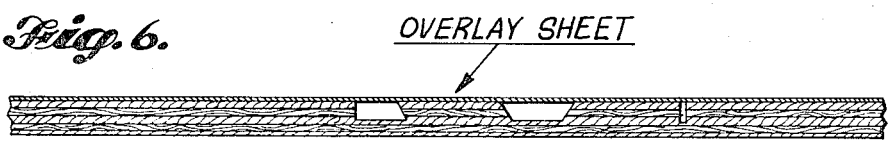
Fig. 6. OVERLAY SHEET
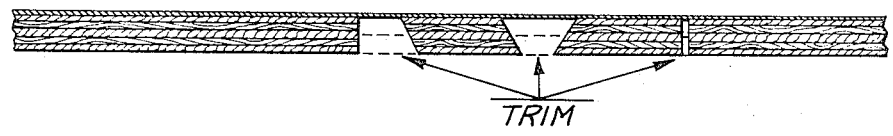
Fig. 7. TRIM
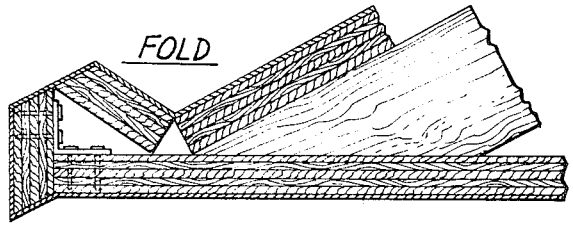
FOLD
Fig. 8.
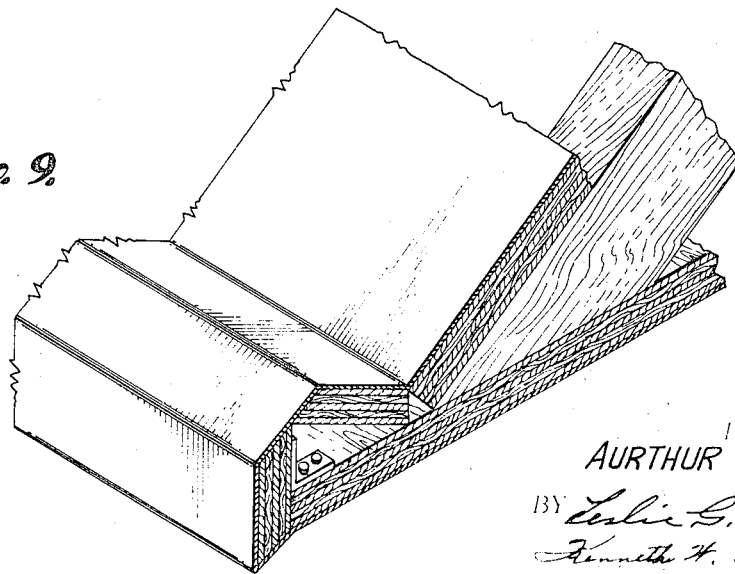
Fig. 9.
INVENTOR
AURTHUR S. RYAN
BY Leslie G. Noller &
Kenneth H. Vernon
ATTORNEYS

United States Patent Office 3,553,048
Patented Jan. 5, 1971

3,553,048
METHOD OF MAKING A SURFACE OVERLAY PRODUCT
Arthur S. Ryan, Kelso, Wash., assignor to Weyerhaeuser Company, Tacoma, Wash., a corporation of Washington
Filed May 29, 1967, Ser. No. 642,032
Int. Cl. B32b 3/04
U.S. Cl. 156—216    7 Claims

ABSTRACT OF THE DISCLOSURE

A method of making an overlay product by routing portions of a flat, substantially rigid substrate material prior to application of the surface overlay, applying an overlay material of substantially the same dimensions as the substrate to the surface of the substrate having the routed-out portions, trimming away portions of the substrate material to effect a desired configuration and bending the surface overlay material to conform to the design desired.

BACKGROUND OF THE INVENTION

Wood substrates, such as plywood, particleboard, or hardboard, faced with various overlay materials such as aluminum, thin wood veneers or various plastic films are in popular demand. Exterior durability can be achieved by facing plywood or other substrate with aluminum or plastic film. However, when these panels are faced with a surface overlay material and cut into strips or laps, raw unsurfaced edges are exposed which are not only unsightly but weather poorly. These unsurfaced edges can be protected by cutting away portions of the substrate to leave a flap of overlay material which can be bent around the edges. This, however, is a very tricky operation and many times results in a cut through the overlay thus destroying the effectiveness of the end product. In addition, the careful cutting necessary to remove portions of the substrate material from an overlay assembly is impractical for actual plant use because of the close tolerances necessary to prevent cutting through the overlay material.

This invention has for its main advantage a method of making a surface overlay material wherein the problems described above are avoided.

SUMMARY

This invention relates to a method of manufacturing overlay panels of wood or other suitable material. In particular this invention relates to a process for manufacturing flat panels consisting of a relatively thin surfacing sheet over a rigid substrate in such a way as to enable cutting of the assembly and folding of the overlay to protect the edges thus created. The method of this invention comprises taking a flat substantially rigid substrate and routing one or more surfaces of the substrate to a desired configuration, applying over the routed surface of the substrate a relatively thin surfacing sheet, trimming the overlay assembly as desired and folding or bending the overlay material.

The method of this invention, while it may be used in the manufacture of many overlay materials, is particularly adaptable to a method of making a tongue and groove siding or to the making of an integral gutter/cornice/soffit.

BRIEF DESCRIPTION OF THE DRAWINGS

FIGS. 5 to 9 illustrate a method of making an integral gutter/cornice/soffit using the method of this invention.

DETAILED DESCRIPTION OF THE DRAWING

As noted above, FIGS. 1 to 4 illustrate a method of making tongue and grooved siding utilizing the method of this invention. The particular substrate material used may be any suitable construction material such as plywood, particleboard, hardboard, solid lumber panels, or panels having plastic foam cores. Suitable overlay materials include such materials as aluminum sheet, wood veneer having a thickness ranging from $\frac{1}{24}''$ to $\frac{1}{16}''$ in thickness, plastic film, or cellulosic fiber sheet. The overlay materials ideally should have some inherent rigidity so that they will maintain a folded configuration. An ideal facing and one preferably used in the method of this invention is aluminum sheet having a thickness of 6 to 12 mils.

Figure 1:
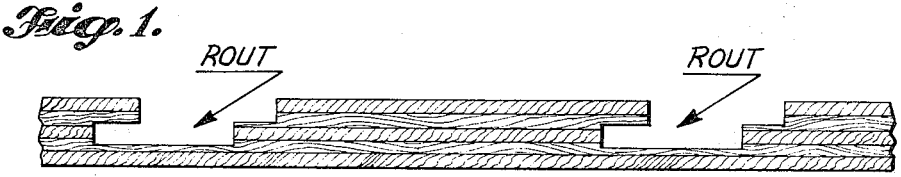
FIGS. 1 to 4 illustrate the method of this invention as it applies to the manufacture of tongue and groove siding.
Figure 2:
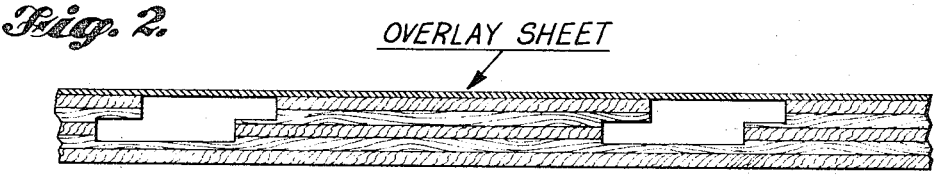
Figure 3:
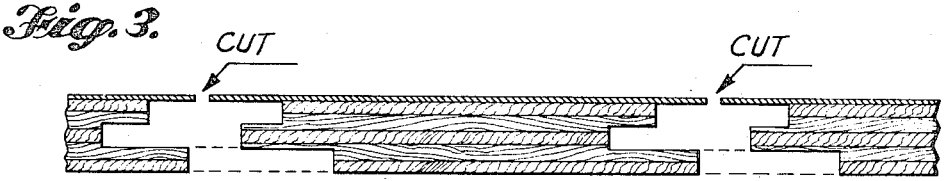
Figure 4:
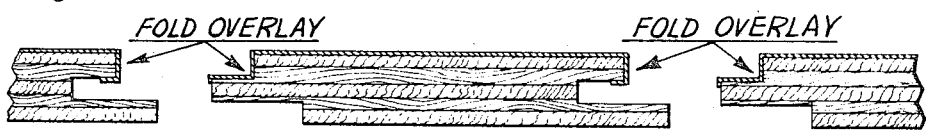

FIG. 1 illustrates a substrate material portions of which have been routed out at regular intervals for ultimate fashioning into a suitable tongue and groove configuration. After the routing operation an aluminum sheet or other surface overlay material is bonded to the surface of the substrate on which the routing operation has been accomplished. A backing material of any suitable material may at the same time be bonded to the other surface of the substrate material. After bonding the surface overlay to the substrate the entire assembly is cut at predetermined intervals as shown in FIG. 3. Additional portions of the substrate material are then trimmed as shown in FIG. 3 to form a suitable tongue and groove configuration. The flap of the surface overlay material remaining is then folded over the exposed edges of the substrate material thus preventing any raw unsurfaced edges from being exposed to weather conditions. After the overlay material has been folded to conform to the substrate configuration, the siding as shown in FIG. 4 is ready for use.

FIGS. 5 through 9 illustrate a method of making an integral gutter/cornice/soffit using the method of this invention. As shown in FIG. 5 one surface of the substrate material 1 is routed at suitable intervals and an overlay material of aluminum or other material is bonded to the routed surface as shown in FIG. 6. As shown in FIG. 7 additional portions of the substrate material are further routed on the surface opposite the overlay material so that discrete portions of the substrate are separated from each other, leaving only the overlay material to hold the assembly together. The assembly is then bent to form, in this case, the gutter/cornice/soffit configuration of FIGS. 8 and 9.

The usual method of manufacturing such assemblies has been to first bond a surface overlay material to a flat panel and then attempt to rout out portions of the substrate material to give an assembly such as shown in FIG. 7. To do this has required careful cutting, as any miscalculation usually results in cutting through the overlay material and spoiling the entire assembly as far as commercial use is concerned. The method of this invention alleviates these problems and allows a pre-routed, substantially rigid, flat substrate material to be bonded with a surface overlay material having approximately the same dimensions as the substrate and cut into a desired configuration without affecting in any way the quality of the final assembly. Although only two products are shown in the appended drawings it is evident that the method of this invention is applicable to many other products where kerfing or routing must be carried out to permit bending. Such other products may include, for example, a soffit-fascia assembly or a soffit-gutter assembly, wall panels and many other types of construction.

The method of this invention thus permits a simple, efficient, easy method of making a substantially rigid flat substrate material having a suitable overlay material without the problems inherent in the methods practiced heretofore.

What is claimed is:

1. A method of making a surface overlay assembly consisting of a rigid substrate material and a relatively thin surface overlay material, so that portions of the substrate can be easily removed from the opposite surface of the surface to which the overlay material is bonded without cutting or marring the overlay material comprising:
   (a) routing the substrate material prior to application of the surface overlay,
   (b) applying and bonding the surface overlay material to the routed surface of the substrate,
   (c) trimming the substrate material to conform to the desired configuration,
   (d) cutting apart the overlay material at predetermined points where previously routed to form separate assemblies, and
   (e) wrapping the loose ends of said overlay, resulting from said cutting, around the routed surfaces of the substrate.

2. Method according to claim 1 wherein the substrate is a material selected from the group consisting of plywood, hardboard, particleboard, solid lumber panels and plastic foam.

3. Method according to claim 1 wherein the overlay material is selected from the group consisting of aluminum sheet, plastic film, thin wood veneer and cellulosic fiber sheet.

4. Method of making tongue and groove surface clad siding which comprises:
   (a) routing portions of a flat, rigid substrate material to conform substantially to a tongue and groove configuration,
   (b) applying a flat sheet of surface overlay material of substantially the same dimensions as the substrate material to the surface of the substrate previously routed,
   (c) cutting apart the overlay assembly at predetermined points where previously routed,
   (d) trimming the separate assemblies to the desired configuration, and
   (e) wrapping the exposed edges of the overlay material around the routed edges of the substrate to prevent exposure of the unsurfaced edges to inclement weather.

5. Method according to claim 4 wherein the substrate is one selected from the group consisting of plywood, hardboard, particleboard, solid lumber panels, and plastic foam.

6. Method according to claim 4 wherein the substrate material is routed to form a rectangular substrate material having, when the routed portions are separated from each other by cutting, a first half lap flange at one end of the substrate and a second half lap flange at the other end so that the ends of adjacent materials, when assembled, may be overlapped.

7. Method according to claim 4 wherein the overlay material is aluminum having a thickness ranging from 1 to 6 mils.

References Cited

UNITED STATES PATENTS

| | | | |
|---|---|---|---|
| 2,508,128 | 5/1950 | Waards | 156—257 |
| 2,709,668 | 5/1955 | Thompson | 156—216X |
| 2,742,238 | 4/1956 | Giuliani | 156—216X |
| 2,890,919 | 6/1959 | Hansen | 156—216X |

SAMUEL W. ENGLE, Primary Examiner

U.S. Cl. X.R.

144—309; 156—257, 258